US009490882B1

(12) United States Patent
Schelstraete et al.

(10) Patent No.: US 9,490,882 B1
(45) Date of Patent: Nov. 8, 2016

(54) COMPOSITE SOUNDING FOR MIMO BEAMFORMING IN A WIRELESS HOME NETWORK

(71) Applicant: Quantenna Communications, Inc., Fremont, CA (US)

(72) Inventors: Sigurd Schelstraete, Menlo Park, CA (US); Simon John Duxbury, Piedmont, CA (US)

(73) Assignee: Quantenna Communications, INC., Fremont, CA (US)

( * ) Notice: Subject to any disclaimer, the term of this patent is extended or adjusted under 35 U.S.C. 154(b) by 47 days.

(21) Appl. No.: 14/701,495

(22) Filed: Apr. 30, 2015

Related U.S. Application Data

(60) Provisional application No. 61/986,365, filed on Apr. 30, 2014, provisional application No. 62/000,940, filed on May 20, 2014.

(51) Int. Cl.
| | |
|---|---|
| *H04W 4/00* | (2009.01) |
| *H04B 7/04* | (2006.01) |
| *H04W 74/00* | (2009.01) |
| *H04W 84/12* | (2009.01) |
| *H04W 88/08* | (2009.01) |

(52) U.S. Cl.
CPC ............ *H04B 7/043* (2013.01); *H04B 7/0417* (2013.01); *H04B 7/0452* (2013.01); *H04B 7/0456* (2013.01); *H04W 74/006* (2013.01); *H04W 84/12* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 9,078,153 B1* | 7/2015 | Schelstraete | .......... | H04W 88/08 370/329 |
| 2008/0219373 A1* | 9/2008 | Zhang | .................. | H04B 7/0417 375/262 |
| 2010/0309834 A1* | 12/2010 | Fischer | ................ | H04B 7/0452 370/312 |
| 2011/0142020 A1* | 6/2011 | Kang | .................... | H04L 5/0048 370/338 |
| 2013/0272439 A1* | 10/2013 | Zhang | .................. | H04B 7/0456 375/267 |
| 2014/0003384 A1* | 1/2014 | Zhang | .................. | H04B 7/0413 370/329 |
| 2015/0117329 A1* | 4/2015 | Avudainayagam | ...... | H04B 3/54 370/329 |
| 2015/0236831 A1* | 8/2015 | Kang | .................... | H04L 5/0048 370/338 |
| 2016/0127019 A1* | 5/2016 | Schelstraete | ......... | H04B 7/0617 370/252 |

* cited by examiner

*Primary Examiner* — Anh-Vu Ly
(74) *Attorney, Agent, or Firm* — IP Creators; Charles C Cary

(57) ABSTRACT

A wireless access point including: a sounding mode module, a sounding matrix generator, a sounding aggregator, and a beamforming expansion module. The sounding mode module determines whether a number of communication streams supported by the WAP matches the number of streams contained in a sounding response from a station, and initiates a composite set of an integer "N" soundings when those capabilities do not match. The sounding matrix generator generates "N" linearly independent spatial mapping matrices each associated with a corresponding one of the set of composite soundings. The sounding aggregator aggregates a plurality of partial beamforming matrices received from the targeted station node in response to the composite soundings. The beamforming expansion module expands the aggregated beamforming matrices into a full beamforming matrix for spatially mapping downlink communications between the WAP and the targeted station node.

20 Claims, 7 Drawing Sheets

Sounding Sequence

PRIOR ART: Sounding Station with Limited Capability  FIG. 1A

DOWNLINK COMMUNICATION  FIG. 1B

Sounding Sequence  FIG. 1C

Sounding Packet  FIG. 1D

Sounding Station(s) with Limited Capabilities  FIG. 2A

DOWNLINK COMMUNICATION  FIG. 2B

Sounding Sequence  FIG. 2C

Set of Sounding Packets  FIG. 2D

MU-MIMO to Stations with
Limited Sounding Feedback
Capability

FIG. 4B    Composite Soundings increase Beamforming Strength

FIG. 6 MIMO WAP with Enhanced Support for Sounding Stations with Limited Capabilities FIG. 7    Method for Improved MIMO WAP Beamforming

COMPOSITE SOUNDING FOR MIMO BEAMFORMING IN A WIRELESS HOME NETWORK

CROSS REFERENCE TO RELATED APPLICATION

This application claims the benefit of prior filed Provisional Application No. 61/986,365 filed on Apr. 30, 2014 entitled "Composite Sounding for Systems with High Number of Transmit Antenna" and 62/000,940 filed on May 20, 2014 entitled "Composite Sounding for Single-Antenna Client Stas" both of which are incorporated herein by reference in their entirety as if fully set forth herein.

BACKGROUND OF THE INVENTION

1. Field of Invention

The field of the present invention relates in general to wireless local area networks including wireless access points (WAP) and wireless stations and sounding methods therefore.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the wireless medium is in use.

Communications on the single communication medium are identified as "simplex" meaning, one communication stream from a single source node to one or more target nodes at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with multiple single antenna single stream devices concurrently, thereby increasing the time available for discrete MIMO video links to wireless HDTVs, computers tablets and other high throughput wireless devices the communication capabilities of which rival those of the WAP.

In order to characterize the communication channel between the WAP and each station a sounding is conducted. An explicit sounding consists of the transmission of a known sequence from the WAP to each associated station, followed by a sounding response from the station characterizing the communication channel between the WAP and itself. The WAP uses the sounding response to focus its antennas in a manner which improves either or both signal strength at the station or downlink throughput thereto.

What is needed are improved methods for sounding each communication link between the WAP and its associated stations.

SUMMARY OF THE INVENTION

The present invention provides a method and apparatus for a wireless access point (WAP) apparatus to enhance communications with target stations that do not support sounding feedback which matches the capability of the WAP.

In an embodiment of the invention a wireless access point (WAP) apparatus having a plurality of antennas and supporting multiple-input multiple-output (MIMO) wireless communications with associated station nodes on a selected one of a plurality of orthogonal frequency division multiplexed (OFDM) communication channels is disclosed. The WAP includes: a sounding mode module, a sounding matrix generator, a sounding aggregator, and a beamforming expansion module. The sounding mode module is configured to determine whether a number of communication streams supported by the WAP matches the number of communication streams contained in a sounding response from at least one targeted station node among the associated station nodes, and to initiate either a single sounding or a composite set of an integer "N" soundings of the communication channel between the WAP and the at least one targeted station node based on an affirmative and a negative match determination respectively. The sounding matrix generator is configured to generate "N" linearly independent (LI) spatial mapping matrices (SMM) each associated with a corresponding one of the soundings in the composite set of soundings from the WAP, responsive to a negative match determination by the sounding mode module. The sounding aggregator is configured to aggregate a plurality of partial beamforming matrices received from the at least one targeted station node in response to the composite soundings generated by the sounding matrix generator. The beamforming expansion module is configured to expand the plurality of partial beamforming matrices aggregated by the sounding aggregator into a full beamforming matrix for spatially mapping downlink communications between the WAP and the at least one targeted station node; thereby enhancing the communication capabilities of the WAP.

The invention may be implemented in hardware, firmware or software.

Associated methods and computer readable media containing program instructions are also claimed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

The present invention provides a method and apparatus for increasing downlink throughput from a multiple-input multiple-output (MIMO) WAP and a station.

FIGS. 1A-D are respectively Prior Art downlink sounding and communication system views, and sounding packet timing and packet structure diagrams of a communication link between a Wireless Access Point (WAP) and a station with constrained sounding capabilities.

Figure 1A:
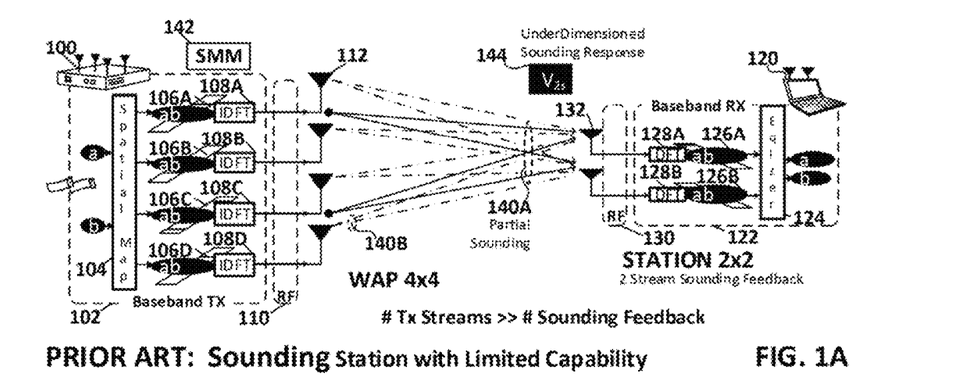
FIGS. 1A-D are respectively Prior Art downlink sounding and communication system views, and sounding packet timing and packet structure diagrams of a communication link between a Wireless Access Point (WAP) and a station with constrained sounding capabilities.

FIG. 1A is a system diagram showing a sounding by a Prior Art WAP 100 of a downlink channel between it and a target station 120. The WAP, a.k.a. a 4×4 WAP, has 4 antennas and supports up to 4 streams of downlink and uplink communications. The WAP has a baseband section 102 and a radio frequency (RF) section 110 coupled to 4 multiple-input multiple-output (MIMO) antennas 112. The baseband transmit portion is shown and the corresponding receive portion is not. A spatial mapper 104 maps up to four communication streams onto the communication chains associated each of the antenna. The mapping includes changes to the phase and amplitude of each stream to focus, a.k.a. beamform, the downlink communications to the station. The output of the spatial mapper is coupled to the input bins 106A-D of the inverse discrete Fourier Transform (IDFT) modules 108A-D which transform the transmitted communication from frequency to the time domain. These in turn couple through associated RF components with a corresponding one of the four antenna 112. The station 120 is identified as a 2×2 device having two antenna and supporting up to 2 streams of downlink and uplink communications. The station has a baseband section 122 and a radio frequency (RF) section 130 coupled to 2 multiple-input multiple-output (MIMO) antennas 132. The baseband receive portion is shown and the corresponding transmit portion is not. The discrete Fourier Transform (DFT) modules 128A-B are coupled to a corresponding one of the two antenna 132, to transform received communications from the time to the frequency domain. The output bins 126A-B of the DFT modules are coupled to the input of the equalizer 124. The sounding feedback capabilities of the station 120 do not match the WAPs capabilities in terms of number of streams and antennas. The WAP could handle up to 4 streams on a downlink sounding, but can not do so because the station is only capable of providing sounding feedback for up to two streams. This Prior Art sounding is limited to a single spatial mapping matrix (SMM) 142 for the single channel/link sounding. The SMM maps the proscribed sounding bits and phases redundantly onto the MIMO antenna array, i.e. 2 pairs of antenna each have the same sounding signal, phase and amplitude. The sounding is said to be partial, because it does not include unique signals on each of the antenna and thus does not allow channel characterization of all possible paths 140B (dotted lines) between the transmit and receive antennas of the WAP and station respectively. The station 120 receives this partial sounding 140A and determines the two stream beamforming matrix 144 which will help t focus the subsequent downlink communications from the WAP.

Figure 1B:
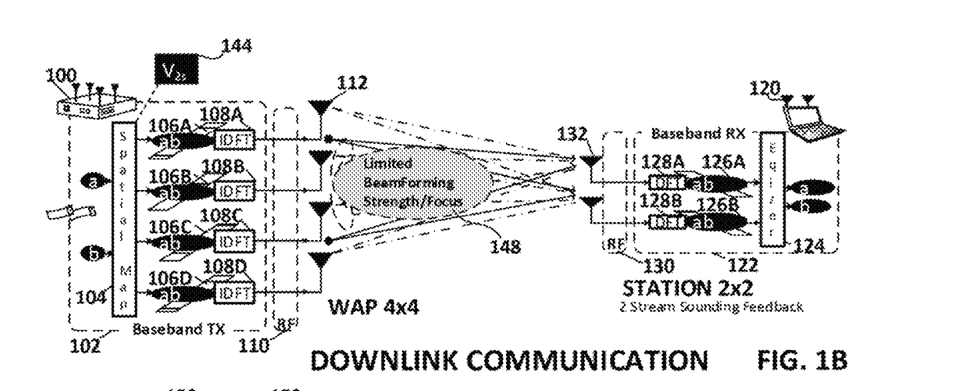

As shown in FIG. 1B the Prior Art WAP 100 uses the single beamforming matrix 144 provided by the station in its sounding response as an input to the spatial mapper 104, to steer/focus/beamform 148 the downlink communications from its MIMO antenna array. Unfortunately, the beamforming signal strength or focus is limited by the lack of a complete characterization of all the possible paths between Transmit and Receive antennas during the single sounding. In other words, with a single two stream sounding response provided by the station 120 the WAP is unable to fully characterize the downlink communication channel, thus degrading its beamforming capabilities.

Figure 1C:
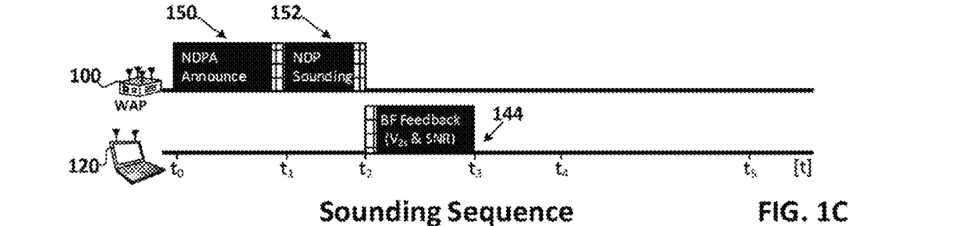

FIG. 1C is a Prior Art detailed explicit sounding timing diagram showing a detailed view of a representative Prior Art sounding as shown in FIG. 1A. An Explicit sounding of the link channel between the WAP 100 and station 120 is shown. The packets 150, 152, 144 are all associated with the sounding. All packets including those associated with the sounding, include a header portion shown in crosshatch. Following the sounding, communications resume and downlink communication of user data is sent on the link(s) that have been sounded. These user data packet(s) are sent using the associated beamforming matrix determined during the preceding sounding.

The explicit sounding provided for in the IEEE 802.11ac standard allows the receiver to assist the transmitter to steer subsequent user data communications toward the receiver using the beamforming matrix provided by the receiver in response to the explicit link channel sounding initiated by the transmitter. An explicit sounding may be initiated by a WAP or a station. In the example shown the WAP 102 initiates the sounding by sending at time $t_0$ sends a null data packet announcement (NDPA) frame 150. The NDPA identifies the WAP and the target recipient station(s) for the sounding. Next at time $t_1$ a null data packet (NDP) 152 is sent by the WAP. This packet like all the other packets associated with the sounding contains no user data rather the header of the packet contains a ubiquitous preamble field, which in the case of the IEEE 802.11ac standard is identified as the VHT-LTF field 170 shown in FIG. 1D. The VHT-LTF field a.k.a. channel estimation or sounding field, contains a long training sequence used for MIMO channel estimation by the receiver. Each recipient device then determines the corresponding beamforming matrix required to adjust the phase and amplitude of subsequent MIMO transmissions by the WAP so as to improve the received signal strength at the receiving station. The target e.g. station 120 then responds at time $t_2$ with the beamforming feedback packet 144 containing channel state information (CSI) including the beamforming matrix "V". In the example shown, the "V" matrix is a 2×2 matrix. If the receiving station is IEEE 802.11ac compliant the feedback is in the form of the actual unitary beamforming matrix V and the per tone diagonal matrix Σ which is directly related to the per tone signal to noise ratio (SNR).

Figure 1D:
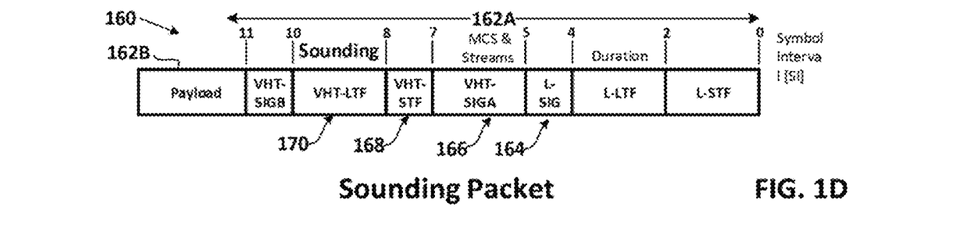

FIG. 1D is a packet diagram of a WLAN packets including the sounding field. All WLAN packets whether associated with communicating a sounding or with the communication of user data include a ubiquitous header portion. All WLAN packet headers include various preamble fields with known sequences which allow the receiving station to synchronize reception with packet boundaries and to determine the received channel. What makes a sounding packet a sounding packet is not the sounding field in the header, rather the NDPA payload instructions which identify the receiving stations which are requested to share their channel analysis with the transmitter so as to improve its subsequent communications. FIG. 1D shows such a packet 160 and the corresponding symbol interval (SI) required to transmit each field thereof. The header 162A includes a legacy portion containing the L-STF, L-LTF and L-SIG fields and a very high throughput portion containing the VHT-SIG-A, VHT-STF, VHT-LTF and VHT-SIG-B fields. The payload portion 162B contains no user data. The legacy (L), long (LTF) and short (STF) training and signal (SIG) 164 fields are compatible with stations supporting only the IEEE 802.11n or earlier standards. The remaining signal and training fields are intended only for very high throughput, e.g. IEEE 802.11ac compliant devices. The VHT-SIG-A field 166 contains information on the modulation and coding scheme (MCS) and number of streams of the sounding. The VHT-STF field 168 is used for automatic gain control (AGC). The VHT-LTF field 170, a.k.a. channel estimation or sounding field, contains a long training sequence used for MIMO channel estimation by the receiver.

Figure 2A:
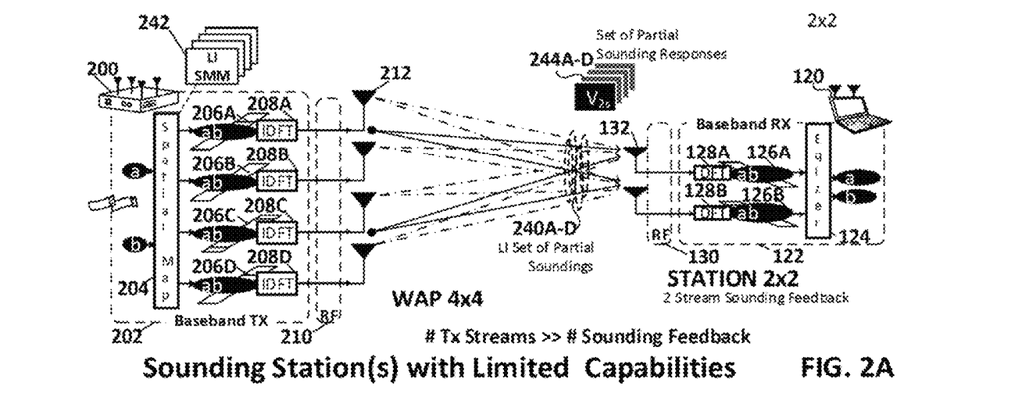
FIGS. 2A-D are respectively downlink sounding and communication system views, and sounding packet timing and packet structure diagrams of a communication link between a Wireless Access Point (WAP) and a station with constrained sounding capabilities in accordance with an embodiment of the invention.

FIGS. 2A-D are respectively downlink sounding and communication system views, and sounding packet timing and packet structure diagrams of a communication link between a Wireless Access Point (WAP) and a station with constrained sounding capabilities in accordance with an embodiment of the invention;

FIG. 2A is a system diagram showing a composite sounding by WAP 200 of a downlink channel between it and a target station 120. The WAP, a.k.a. a 4×4 WAP, has 4 antennas and supports up to 4 streams of downlink and uplink communications. It supports composite soundings when required to fully characterize a communication channel. The WAP has a baseband section 202 and a radio frequency (RF) section 210 coupled to 4 multiple-input multiple-output (MIMO) antennas 212. The baseband transmit portion is shown and the corresponding receive portion is not. A spatial mapper 204 maps up to four communication streams onto the communication chains associated each of the antenna. The mapping includes changes to the phase and amplitude of each stream to focus, a.k.a. beamform, the downlink communications to the station. The output of the spatial mapper is coupled to the input bins 206A-D of the inverse discrete Fourier Transform (IDFT) modules 208A-D which transform the transmitted communication from frequency to the time domain. These in turn couple through associated RF components with a corresponding one of the four antenna 212. The station 120 is identified as a 2×2 device having two antenna and supporting up to 2 streams of downlink and uplink communications. The station has a baseband section 122 and a radio frequency (RF) section 130 coupled to 2 multiple-input multiple-output (MIMO) antennas 132. The baseband receive portion is shown and the corresponding transmit portion is not. The discrete Fourier Transform (DFT) modules 128A-B are coupled to a corresponding one of the two antenna 132, to transform received communications from the time to the frequency domain. The output bins 126A-B of the DFT modules are coupled to the input of the equalizer 124. The sounding feedback capabilities of the station 120 do not match the WAPs capabilities in terms of number of streams and antennas. The WAP detects this sounding capability mismatch and determines the number of composite soundings and the linearly independent (LI) spatial mapping matrices (SMM) 242 associated with each that will allow for full characterization of the downlink communication channel between the WAP and the station. The WAP sends out each of the Linearly Independent partial soundings 240A-D using the LI SMM, and receives in response to each a single partial sounding response, the aggregate of which is the set 244A-D of partial sounding responses.

Figure 2B:
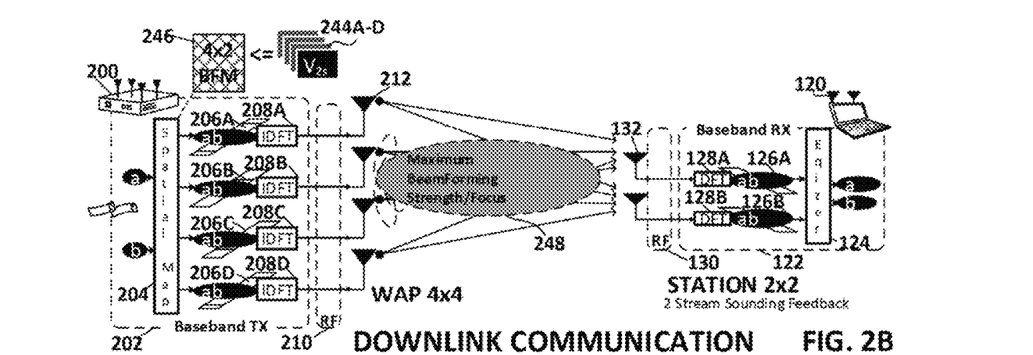

As shown in FIG. 2B the WAP 200 aggregates the set of partial sounding responses 244A-D and expands them into a full beamforming matrix 246 for steering/focusing/beamforming subsequent downlink communications to the WAP. This fully dimensioned beamforming matrix maximizes the RF signal strength 248 from the MIMO antenna array at the antennas 132 of the receiving station 120. This corresponds to a 3-6 dB improvement in signal strength as opposed to the single sounding of the prior art WAP shown in FIGS. 1A-B.

Figure 2C:
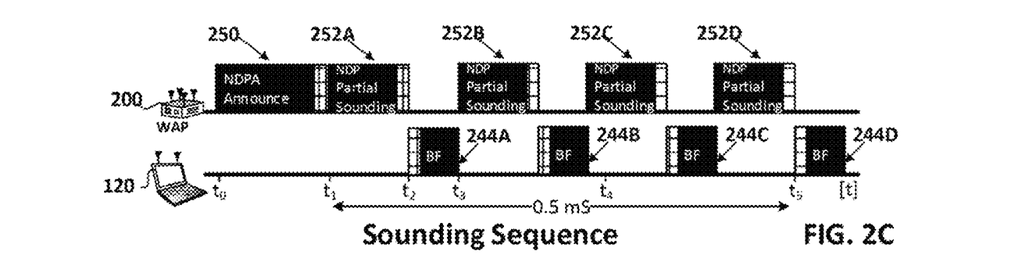

FIG. 2C is a detailed explicit sounding timing diagram showing a representative composite sounding in accordance with an embodiment of the invention shown in FIG. 2A. An Explicit sounding of the link channels between the WAP 200 and station 120 are shown. The packets 250, 252, 244 are all associated with the composite sounding. All packets including those associated with the sounding, include a header portion shown in crosshatch. Following the sounding, communications resume, and user data is sent on the link(s) that have been sounded. These user data packet(s) are sent using the associated beamforming matrix determined during the preceding composite sounding.

The explicit sounding provided for in the IEEE 802.11ac standard allows the receiver to assist the transmitter to steer subsequent user data communications toward the receiver using the beamforming matrix provided by the receiver in response to the explicit link channel sounding initiated by the transmitter. An explicit sounding may be initiated by a WAP or a station. In the example shown the WAP 200 initiates the sounding by sending at time $t_0$ a null data packet announcement (NDPA) frame 250. The NDPA identifies the WAP and the target recipient station(s) for the sounding. Where more than one station is a target recipient, the order in which the recipient stations are listed controls the order of their response. Next at time $t_1$ a null data packet (NDP) 252A is sent by the WAP. This packet like all the other packets associated with the sounding contains no user data rather the header of the packet contains a ubiquitous preamble field, which in the case of the IEEE 802.11ac standard is identified as the VHT-LTF field 270 shown in FIG. 2D. The VHT-LTF field a.k.a. channel estimation or sounding field, contains a long training sequence used for MIMO channel estimation by the receiver. Each recipient device then determines the corresponding beamsteering/beamforming matrix required to adjust the phase and amplitude of subsequent MIMO transmissions by the WAP so as to maximize the received signal strength at the receiving station. The target e.g. station 120 then responds at time $t_2$ with the beamforming feedback packet 244A containing channel state information (CSI). If the receiving station is IEEE 802.11ac compliant the feedback is in the form of the actual unitary beamsteering matrix V and the per tone diagonal matrix SNR. Any remaining stations targeted by the initial sounding, respond with the beamsteering matrix for their own link when asked to do so by the WAP. The WAP in this embodiment of the invention has determined based on the mismatch between the # of streams supported by the WAP and the number of streams in sounding feedback from the station that composite soundings are required. It then sends three subsequent soundings 252B-D each prompting a corresponding one of sounding responses 244B-D. These composite soundings each sent with linearly independent spatial mapping allow the WAP to expand the channel characterization to a full beamforming matrix in which all paths between the MIMO transmit and receive antenna are characterized. Alternatively, the expanded sounding information that is obtained from the set of partial sounding feedbacks can be used to assist in calibration of the transmit and receive paths of the WAP.

Figure 2D:
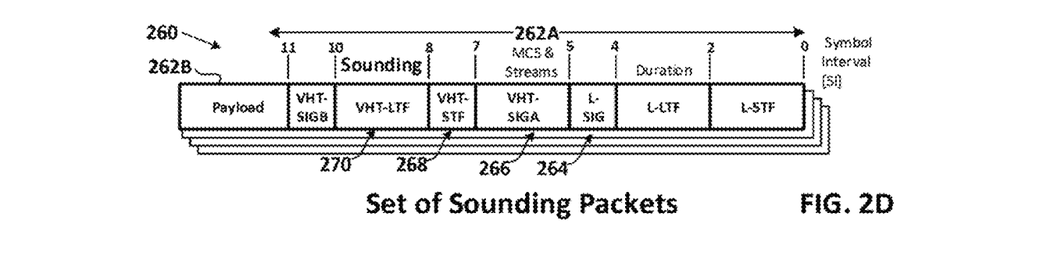

FIG. 2D is a packet diagram of a WLAN packets including the sounding field. All WLAN packets whether associated with communicating a sounding or with the communication of user data include a ubiquitous header portion. All WLAN packet headers include various preamble fields with known sequences which allow the receiving station to synchronize reception with packet boundaries and to determine the received channel. What makes a sounding packet a sounding packet is not the sounding field in the header, rather the NDPA payload instructions which identify the receiving stations which are requested to share their channel analysis with the transmitter so as to improve its subsequent communications. FIG. 1D shows such a packet 260 and the corresponding symbol interval (SI) required to transmit each field thereof. The header 262A includes the legacy portion containing the L-STF, L-LTF and L-SIG fields and the very high throughput portion containing the VHT-SIGA, VHT-STF, VHT-LTF and VHT-SIGB fields. The payload portion 262B contains no user data. The legacy (L), long (LTF) and short (STF) training and signal (SIG) 264 fields are compatible with stations supporting only the IEEE 802.11n or earlier standards. The remaining signal and training fields are intended only for very high throughput, e.g. IEEE 802.11ac compliant devices. The VHT-SIGA field 266 contains information on the modulation and coding scheme (MCS) and number of streams of the sounding. The VHT-STF field 268 is used for automatic gain control (AGC). The VHT-LTF field 270, a.k.a. channel estimation or sounding field, contains a long training sequence used for MIMO channel estimation by the receiver. The VHT-LTF field of each sounding packet is spatially mapped with an associated one of a set of linearly independent spatial mapping matrices as determined by the WAP.

FIGS. 3A-D are system views of a downlink composite sounding set in accordance with an embodiment of the invention. Four soundings 340A-D each transmitted using a corresponding one of four linearly independent (LI) spatial mapping matrices (SMM) 342A-D are used to fully characterize the downlink communication channel via the aggregate set made up of the four individual partial sounding responses 344A-D. The WAP 300 is an 8×8 device with 8 antennas and up to 8 streams. The mapping of streams to antennas is handled by the spatial mapper 304. The receiving station 320 is a 2×2 station with 2 antenna and up to 2 communication streams. This station can provide sounding feedback on up to four sounded streams but can only support downlink communications on two. The station includes a baseband stage 322 and an RF stage 330. The baseband stage includes DFT modules 328A-B the output bins of which 326A-B are coupled to the equalizer 324.

Figure 3A:
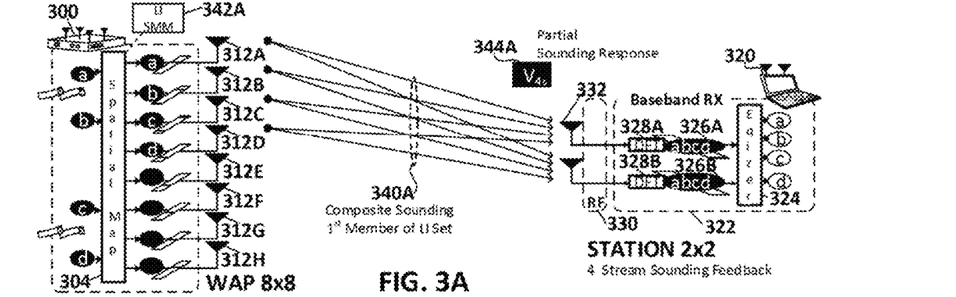
FIGS. 3A-D are system views of a downlink composite sounding set in accordance with an embodiment of the invention.
Figure 3B:
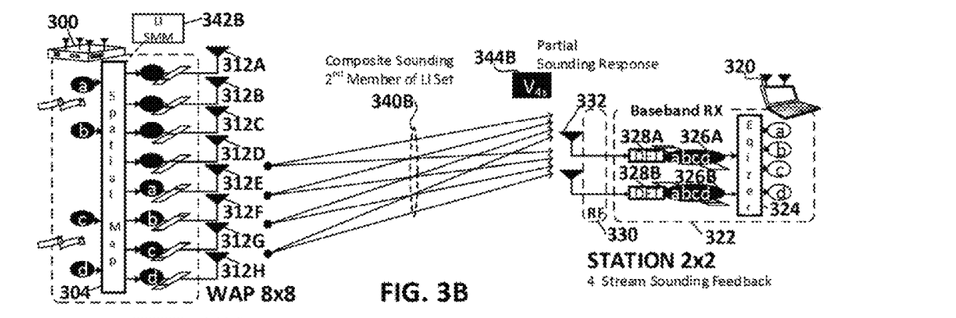
Figure 3C:
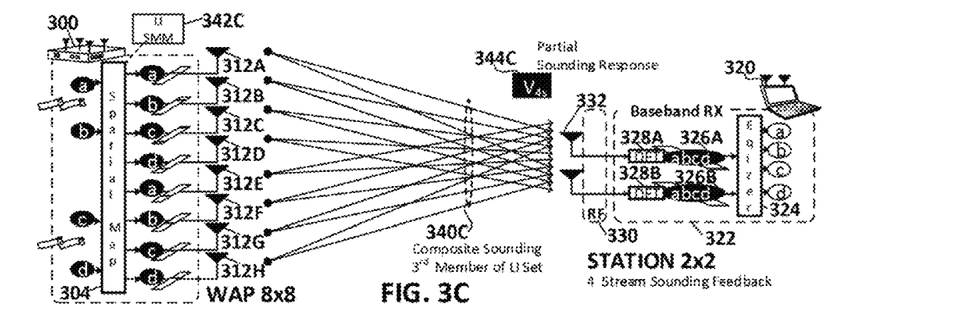
Figure 3D:
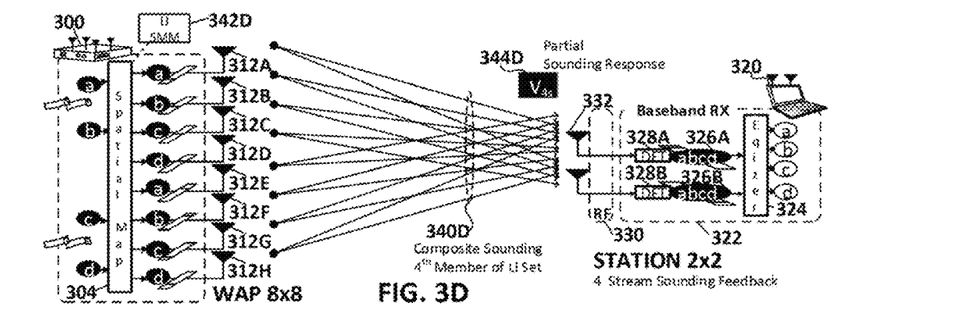

The $1^{st}$ composite sounding shown in FIG. 3A spatially maps streams "a-d" onto individual ones of antennas 312A-D respectively. The $2^{nd}$ composite sounding shown in FIG. 3B spatially maps streams "a-d" onto individual ones of antennas 312E-H respectively. The $3^{rd}$ composite sounding shown in FIG. 3C spatially maps each of streams "a-d" onto a corresponding pair of antenna, e.g. stream "a" onto antenna 312A, 312E; stream "b" onto antenna 312B, 312F; stream "c" onto antenna 312C, 312G; stream "d" onto antenna 312D, 312H; and includes a scalar to normalize total transmit power with that of the other soundings. The $4^{th}$ composite sounding shown in FIG. 3D is identical to the third with the exception of the signal on antennas 312E-G which are each rotated 90 degrees.

Example: 8×8 WAP to STATION with 4 Stream Feedback

The 802.11ac standard allows for MIMO systems with up to eight antennas. Using eight antennas at the transmitter provides advantages for beamforming and multi-user MIMO. In order to get the optimal benefit, the system also needs to have access to channel information, which is provided by the receivers in response to "sounding frames". However, the response capabilities of some receivers may not be sufficient for transmitters with higher numbers of antennas (say, larger than four). Below, we describe a method to get channel information from "legacy receivers" (i.e. receivers that provided only four-stream feedback) and combine that information into channel information that is optimal for use by an eight-antenna device.

Assume we have a transmitter with eight antennas. To get the best performance for beamforming or MU-MIMO, we need to get the as much information about the channel as possible. Therefore we'd like to have sounding information that allows us to individually control the eight degrees of freedom represented by the transmit antennas. In practice, this means that the intended receiver has to provide eight-stream feedback in response to an eight-stream sounding frame. A receiver could theoretically provide sounding feedback for eight transmit antennas, even if it's number of receive antennas is lower than eight (even as low as one). In practice however, many clients choose to only process a lower number of streams to limit the complexity of the receiver implementation. This leaves us with the following problem statement: Given a transmitter with eight antennas and a receiver that is only capable of providing feedback to a four-stream sounding packet, can we obtain information that is equivalent to eight-stream feedback by a number of sequential four-stream soundings? We explicitly assume four stream feedback in the remainder of the analysis, although this is not strictly inherent to the mechanism.

Sequential Soundings

The channel between an eight-antenna receiver and a receiver with $N_{RX}$ antennas is described by an $N_{RX} \times 8$ matrix $H_{N_{RX} \times 8}$. This matrix can be decomposed using SVD as follows:

$$H_{N_{RX} \times 8} = U_{N_{RX} \times N_{RX}} \Sigma_{N_{RX} \times 8} V_{8 \times 8}^{+} \quad (1)$$

A receiver capable of processing an eight-stream sounding packet would provide information that is equivalent to $\Sigma_{N_{RX} \times 8}$ and $V_{8 \times 8}$. This corresponds to the "MU-style" sounding feedback. The method discussed here relies on the availability of both Σ and V. The challenge is to derive essentially the same information while staying within the limitations of the receiver (i.e. working with four-stream feedback only). If the receiver can only process M=4 streams, we map the M streams to the eight antennas using a Spatial Mapping matrix Q with dimensions 8×M. The resultant channel $\tilde{H}$ becomes:

$$\tilde{H} = H_{N_{RX} \times 8} Q_{8 \times M} \quad (2)$$

$\tilde{H}$ is an $N_{RX} \times M$ matrix. Using SVD, it can be written as:

$$\tilde{H} = \tilde{U}_{N_{RX} \times N_{RX}} \tilde{\Sigma}_{N_{RX} \times M} \tilde{V}_{M \times M}^+ \quad (3)$$

The receiver performs an SVD of channel 17 and returns the equivalent of the matrices $\tilde{\Sigma}_{N_{RX} \times M}$ and $\tilde{V}_{M \times M}$. At the same time, the channel R can also be written as:

$$\tilde{H} = H_{N_{RX} \times 8} Q \quad (4)$$
$$= U \sum V_8^+ Q$$

Next, we observe that the M×M matrix $\tilde{H}^+ \tilde{H}$ can be written in two equivalent ways.
First, from (3), $\tilde{H}^+ \tilde{H}$ is equal to:

$$\tilde{H}^+ \tilde{H} = \tilde{V}_{M \times M} \tilde{\Sigma}_{M \times N_{RX}}^+ \tilde{\Sigma}_{N_{RX} \times M} \tilde{V}_{M \times M} \quad (5)$$

On the other hand, from (4), $\tilde{H}^+ \tilde{H}$ is also equal to:

$$\tilde{H}^+ \tilde{H} = Q^+ V_8 \sum\nolimits^+ \sum V_8^+ Q \quad (6)$$
$$= Q^+ P Q$$

Expression (5) is fully determined by the sounding feedback provided by the receiver, since it only depends on $\tilde{V}$ and $\tilde{\Sigma}$. Expression (6) is a linear combination of the elements of $V_8 \Sigma^+ \Sigma V_8^+$. The matrix $P = V_8 \Sigma^+ \Sigma V_8^+$ is an 8×8 matrix with a singular value decomposition that has a V and Σ matrix that are identical to the V and E matrix of the original channel $H_{N_{RX} \times 8}$ (see (1)). If we can solve the equality between (5) and (6) for the components of P, we have access to the eight-stream information we are trying to obtain. The solution for V is not unique. If V is a V-matrix for P, then the matrix VD will also be a V-matrix as long as D is a diagonal unitary matrix. This undetermined phase is not an issue for beamforming or MU-MIMO however. Unfortunately, the equality of (5) and (6) is under-determined and does not allow us to derive the full matrix P. This can be resolved by doing four independent sounding and combining the results as discussed below.

By varying the spatial mapping matrix Q, we get access to different parts of the matrix P. By choosing an appropriate set of four independent mapping matrices, we will ultimately have enough equations to recover the full matrix P. The following set of four mapping matrices will serve this purpose:

(7)

$$Q_1 = \begin{bmatrix} \delta_{M \times M} \\ 0_{M \times M} \end{bmatrix} \quad (a)$$

$$Q_2 = \begin{bmatrix} 0_{M \times M} \\ \delta_{M \times M} \end{bmatrix} \quad (b)$$

-continued $$Q_3 = \frac{1}{\sqrt{2}} \begin{bmatrix} \delta_{M \times M} \\ \delta_{M \times M} \end{bmatrix} \quad (c)$$

$$Q_4 = \frac{1}{\sqrt{2}} \begin{bmatrix} \delta_{M \times M} \\ j\delta_{M \times M} \end{bmatrix} \quad (d)$$

Note that it may be possible to choose a different set of four mapping matrices, but we will use the set shown in (7) going forward. FIGS. 3A-3D show the stream-to-antenna mapping associated with each of the four linearly independent composite soundings and corresponding one of the four mapping matrices (7).

It is convenient to write the matrix P as a block-diagonal matrix:

$$P = \begin{bmatrix} P^{(11)} & P^{(12)} \\ P^{(21)} & P^{(22)} \end{bmatrix} \quad (8)$$

Each of the blocks in (8) is a 4×4 matrix. With this notation, we get (using (6) for each of the mapping matrices):

$$\tilde{H}_1^+ \tilde{H}_1 = Q_1^+ P Q_1 \quad (9)$$
$$= P_{1:4,1:4}$$
$$= P^{(11)}$$

$$\tilde{H}_2^+ \tilde{H}_2 = Q_2^+ P Q_2 \quad (10)$$
$$= P_{5:8,5:8}$$
$$= P^{(22)}$$

$$\tilde{H}_3^+ \tilde{H}_3 = Q_3^+ P Q_3 \quad (11)$$
$$= \frac{P^{(11)} + P^{(22)} + P^{(12)} + P^{(21)}}{2}$$

$$\tilde{H}_4^+ \tilde{H}_4 = Q_4^+ P Q_4 \quad (12)$$
$$= \frac{P^{(11)} + P^{(22)} + j(P^{(21)} - P^{(12)})}{2}$$

Each of the matrices $\tilde{H}_1^+ \tilde{H}_1$, $\tilde{H}_2^+ \tilde{H}_2$, $\tilde{H}_3^+ \tilde{H}_3$ and $\tilde{H}_4^+ \tilde{H}_4$ is fully known from the four-stream soundings feedback. From (9)-(12), we can solve for the block components of P (see (8)):

$$P^{(11)} = \tilde{H}_1^+ \tilde{H}_1 \quad (13)$$
$$P^{(22)} = \tilde{H}_2^+ \tilde{H}_2$$
$$P^{(12)} = \tilde{H}_3^+ \tilde{H}_3 + j\tilde{H}_4^+ \tilde{H}_4 - \frac{(1+j)}{2}(\tilde{H}_1^+ \tilde{H}_1 + \tilde{H}_2^+ \tilde{H}_2)$$
$$P^{(21)} = \tilde{H}_3^+ \tilde{H}_3 - j\tilde{H}_4^+ \tilde{H}_4 - \frac{(1-j)}{2}(\tilde{H}_1^+ \tilde{H}_1 + \tilde{H}_2^+ \tilde{H}_2) = P^{(12)+}$$

From (13), we can reconstruct the entire matrix P. Once P is known, we have access to the V and Σ matrix of the original channel $H_{N_{RX} \times 8}$. This requires an SVD on the 8×8 matrix P. Note however that P is hermitian and that we only expect $N_{RX}$ non-zero singular modes. Taking into account this information can reduce the complexity of the SVD that is involved in the calculation (see example below).

Example: $N_{RX}=1$

The task of performing an SVD on the 8×8 matrix P looks very complicated at first. However, we can exploit a priori knowledge about the rank of the matrix. Take the example of a receiver with a single antenna ($N_{RX}=1$). In that case, the 8×8 matrix has rank 1 and can therefore be written in the following form:

$$P = V\sigma^2 V^+ \qquad (14)$$

In (14), V is a normalized 8×1 dimensional vector and $\sigma$ is a single positive real number. Instead of having to perform a full 8×8 SVD, we only have to solve for $\sigma$ and V.

The value of $\sigma$ can be found by observing that:

$$\text{Trace}(P) = \sigma^2 \qquad (15)$$

Since P has rank 1, all columns are either linearly dependent or zero. So, any non-zero column of P will form a complete basis for the non-null space of P. A solution for V is then given by:

$$V = \frac{P(:,1)}{\sigma\sqrt{P(1,1)}} \qquad (16)$$

Provided that $P(1,1)$ is different from zero. If not, another column can be chosen to find the value of V. In this case, one can even forgo the complete calculation of P (as in (8) and (13)), since only a single column is needed to find the desired decomposition (14). Even so, we need to perform the four different soundings since it is not possible to get a complete column without them. Likewise, for other values of $N_{RX}$, suitable simplifications should avoid the need to perform a full 8×8 SVD on P.

Receiver Cooperation

While the technique discussed above is mainly intended to be transparent towards existing implementations, one could conceive a version of the technique that relies on cooperation from the receiver. In this alternate embodiment of the invention, if the receiver is aware of the method being used, the different mapping matrices could be combined in a single sounding. Specifically, instead of sounding four streams in a sounding packet, the sounding packet could contain e.g. eight training symbols. The first four training symbols are mapped with one of the matrices in (7) and the next four with a different matrix. The receiver then processes the eight training symbols as two groups of four, sending back two sets of four-stream feedback. The originator can then combine the sounding feedback as described above. The advantages are that less time is taken up doing the sounding and receiving the feedback. For the receiver, the advantage is that its SVD implementation could potentially be simpler, while still allowing the transmitter to extract the necessary information.

The techniques describe above reconstructs sounding feedback equivalent to the feedback that would be generated by an eight-stream feedback capable device. In some cases, complete information may not be needed. Maybe enough relevant information can be extracted from a single sounding with less than eight streams to get some performance improvement at lower cost. The method then extends to any case where partial sounding can be used to derive some information that is relevant for an eight-stream system. The above discussed method allows an eight-antenna system to extract the equivalent of eight-stream feedback from receivers that are only capable of providing four-stream feedback. The key to making this work is to perform successive soundings with suitable chosen spatial mapping matrices and to combine the results as described.

Sequential Sounding Mapping Matrices

Equations (7a) to (7d) give a possible set of spatial mapping matrices that can be used to reconstruct 8-stream feedback from multiple 4-stream soundings. This set is not the only possible set of mapping matrices that can be used. Below, we'll derive a more general criterion to determine when a set of mapping matrices can be used in sequential sounding. The goal of sequential/composite sounding is to reconstruct an 8×8 matrix P. To find the solution, a set of four 4×4 matrices is given.

$$M_\alpha = Q_\alpha^+ P Q_\alpha, \square = 1, \ldots, 4 \qquad (17)$$

The matrices $Q_\alpha$ are known and are the different spatial mapping matrices used in the sequential sounding. The matrices $M_\alpha$ are constructed from the sounding feedback and are known as well. Not every set of four spatial mapping matrices $Q_i$ will allow us to fully reconstruct the matrix P. Below we'll discuss the criteria for a good set of matrices.

Equation (17) is essentially a set of linear equations in the elements of P (although it is quadratic in $Q_\alpha$). We can rewrite this as:

$$(M_\alpha)_{ij} = \sum_{k,l=1}^{8} (Q_\alpha^*)_{ki} P_{kl} (Q_\alpha)_{lj} \qquad (18)$$

$$= \sum_{k,l=1}^{8} (Q_\alpha^*)_{ki} (Q_\alpha)_{lj} P_{kl}$$

$$= \sum_{(k,l)} c^\alpha_{(i,j)(k,l)} P_{(k,l)}$$

We can now think of each $(M_\alpha)_{ij}$ as a 16×1 vector, $c_{(i,j)(k,l)}^\alpha$ as a 16×64 matrix and $P_{(k,l)}$ as a 64×1 vector. The four equations in (17) are therefore equivalent to:

$$M_{64\times 1} = C_{64\times 64} P_{64\times 1} \qquad (19)$$

The 64×1 vector $M_{64\times 1}$ can be uniquely constructed from the original feedback matrices $M_\alpha$. Likewise, the 64×64 matrix $C_{64\times 64}$ has a unique one-to-one relation with the chosen spatial mapping matrices. So, for a given set of spatial mapping matrices, both $M_{64\times 1}$ and $C_{64\times 64}$ are known.

In the form (19), the original problem has been reformulated as a set of 64 equations in 64 unknowns ($P_{64\times 1}$). Whether a solution exists (and therefore, whether sequential sounding will work for the given set of spatial mapping matrices) depends on the properties of $C_{64\times 64}$. If $C_{64\times 64}$ is non-singular, the solution to (19) is given by:

$$P_{64\times 1} = (C_{64\times 64})^{-1} M_{64\times 1} \qquad (20)$$

Once $P_{64\times 1}$ is known, the desired matrix P can be directly derived from it.

To determine whether a set of matrices $Q_\alpha$ constitutes a good set of mapping matrices for sequential sounding, one can therefore perform the following test:

Construct the matrix $C_{64\times 64}$ corresponding to the matrices $Q_\alpha$

Verify that the matrix $C_{64\times 64}$ is non-singular (and well-conditioned)

If $C_{64\times 64}$ passes the test, the set of matrices $Q_\alpha$ is an acceptable choice for the spatial mapping matrices in a sequential sounding. Note that this does not provide a procedure for constructing the matrices $Q_\alpha$, but it does suggest that a large set of matrices can be found that would work for sequential sounding. Ideally, the matrices $Q_\alpha$ should be chosen such that the inversion problem (20) can be solved as easily as possible. The matrices $Q_\alpha$ that are shown in (7a) to (7d) have the advantage that they greatly simplify the inversion in (20).

Number of Soundings for Stations with More than One Antenna

Expressing the problem as a set of linear equations also allows us to find the number of soundings that is needed in a general case. From Equation (19), we see that we need to solve for up to 64 unknowns. Each sounding produces a 4×4 matrix $M_\alpha$ (see (17)) which ends up contributing elements to the 64×1 vector $M_{64\times 1}$. Since each of the matrices $M_\alpha$ has 16 elements, we need four soundings giving us four $M_\alpha$ to have all elements of $M_{64\times 1}$. In a general case, let's assume that the transmit side (AP) is capable of sounding and using a maximum number of streams equal to $N_{STS,TX}$, which may be equal to the number of transmit antennas that the device has. The client side can provide a maximum of $N_{STS,RX}$ streams. Expressed as a set of linear equations, we would need $N_{STS,TX}^2$ equations to solve for the $N_{STS,TX}^2$ elements of the matrix P. On the other hand, each sounding provides us with $N_{STS,RX}^2$ elements of the "vector" M. Therefore, the minimum number of soundings that is needed to make it possible to solve the equation (3) is given by:

$$\left\lceil \frac{N_{STS,TX}^2}{N_{STS,RX}^2} \right\rceil \quad (21)$$

For each sounding, we also need a Spatial mapping matrix $Q_\alpha$.

Number of Soundings for Single-Antenna Clients

Sequential sounding for 1-antenna clients that provide $N_{STS,RX}$ stream feedback provide an opportunity for reduction in the number of sequential/composite soundings. In this case, we don't have to build up the matrix P as an intermediate to finding the solution. Instead, we directly build up the channel H. The minimum number of steps that is needed for this case is simply:

$$\left\lceil \frac{N_{STS,TX}}{N_{STS,RX}} \right\rceil \quad (22)$$

Additional Soundings:

For certain implementations of the composite sounding method described herein, such as the simplified method for single antenna clients described below, there could be an unknown phase offset between different partial sounding feeedbacks. These phase offsets have to be determined and removed before expansion into the full beamforming matrix. In those cases we can perform additional partial soundings such that there is an overlap in information about the streams that are contained in different partial feedbacks. For instance, one partial sounding feedback could contain information about streams one to four and the second partial sounding feedback could contain information about streams three to six. The duplication of the feedback on streams three and four allows the determination of the unknown phase between the first and second partial sounding feedback.

Composite Sounding for Single Antenna Client Stations

We previously described a method that allows the AP to reconstruct eight-stream feedback from four different sets of four-stream feedback responses. In practice, this means the client STAs need to be sounded four times. It is worth noting that for one-antenna clients, the same multiple-sounding approach can be simplified to two soundings. This result is specific for single-antenna stations only and we'll discuss it in more detail below. Many of the target client devices for MU-MIMO will be single-antenna devices. We can assume that many of these devices will be capable of providing four-stream (MU-type) feedback. It's also fair to assume that in the near future, they will not be capable of providing eight-stream feedback. The channel between the (eight-antenna) AP and the client is a 1×8 matrix. Conceptually, the AP needs to know the $\Sigma$ and V-matrix of the SVD of the 1×8 matrix. For a 1×8 matrix, the 1×1 U-matrix of the SVD is trivial and can be assumed to be 1. This means that the channel can be written as:

$$H_{1\times 8} = \Sigma_{1\times 8} V_{8\times 8}^+ \quad (23)$$

Since $\Sigma_{1\times 8}$ has only one non-zero component, only the first row of $V_{8\times 8}^+$ actually matters. We can rewrite (1) as:

$$(H_{1\times 8})^+ = \sigma_1 V_{8\times 1} \quad (24)$$

In other words: the V-matrix of the 1×8 channel is simply a scaled version of the conjugate of $H_{1\times 8}$. The scaling can be found by taking into account that:

$$(V_{8\times 1})^+ V_{8\times 1} = 1 \quad (25)$$

Therefore:

$$H_{1\times 8}(H_{1\times 8})^+ = (V_{8\times 1})^+ \sigma_1^2 V_{8\times 1} = \sigma_1^2 \quad (26)$$

Or:

$$\sigma_1 = |H_{1\times 8}| \quad (27)$$

So, for a 1×8 channel, the full SVD can be found by the following steps:
1. Assume that the U-matrix is 1
2. Calculate $\sigma_1$ (and therefore the full $\Sigma$-matrix) as in (5)
3. Calculate the V-matrix by dividing $H^+$ by $\sigma_1$ Conversely, given only the E-matrix and the V-matrix, we can reconstruct the full channel by multiplying $\sigma_1$ and $V^+$ This is only possible for $1\times N_{TX}$ channels because only for this case, we do not require knowledge of the U-matrix.

Taking this into account, sequential sounding can be used as follows. First sound with the following 8×4 spatial mapper matrix, which maps four spatial streams to the eight antennas:

$$Q^{(1)} = \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix} \quad (28)$$

The channel observed by the single-antenna client is $H_{1\times 8} Q^{(1)}$.

Note that:

$$H_{1\times 8} Q^{(1)} = [h_1 h_2 h_3 h_4] \quad (29)$$

The client device provides sounding feedback consisting of the scalar value $\sigma_1^{(1)}$ and the 4×1 matrix $V^{(1)}$ such that:

$$[h_1 h_2 h_3 h_4] = \sigma_1^{(1)} (V^{(1)})^+ \quad (30)$$

For the second sounding, we use the spatial mapping matrix shown below:

$$Q^{(2)} = \begin{bmatrix} 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \end{bmatrix} \quad (31)$$

The channel observed by the single-antenna client is now $H_{1 \times 8} Q^{(2)}$.
Note that:

$$H_{1 \times 8} Q^{(2)} = [h_5 h_6 h_7 h_8] \quad (32)$$

The client device provides sounding feedback consisting of the scalar value $\sigma_1^{(2)}$ and the 4×1 matrix $V^{(2)}$ such that:

$$[h_5 h_6 h_7 h_8] = \sigma_1^{(2)} (V^{(2)}) \quad (33)$$

From (30) and (33), we now know the complete 1×8 channel $H_{1 \times 8}$:

$$H_{1 \times 8} = [\sigma_1^{(1)}(V^{(1)})^+ \sigma_1^{(2)}(V^{(2)})^+] \quad (34)$$

The SVD can be found as described earlier for $1 \times N_{TX}$ matrices. Note that the mapping matrices (28) and (31) are not the only matrices that can be used. Pretty much any two matrices that together form 8 linearly independent vectors can be used to reconstruct $H_{1 \times 8}$. Obtaining an eight-stream feedback from four-stream devices by combining feedback from a number of independent four-stream soundings has been discussed above. In its full form, this required four four-stream soundings to get the equivalent of one eight-stream sounding. We show here that the method can be simplified for single-antenna devices, such that only two instead of four soundings are needed.

Figure 4A:
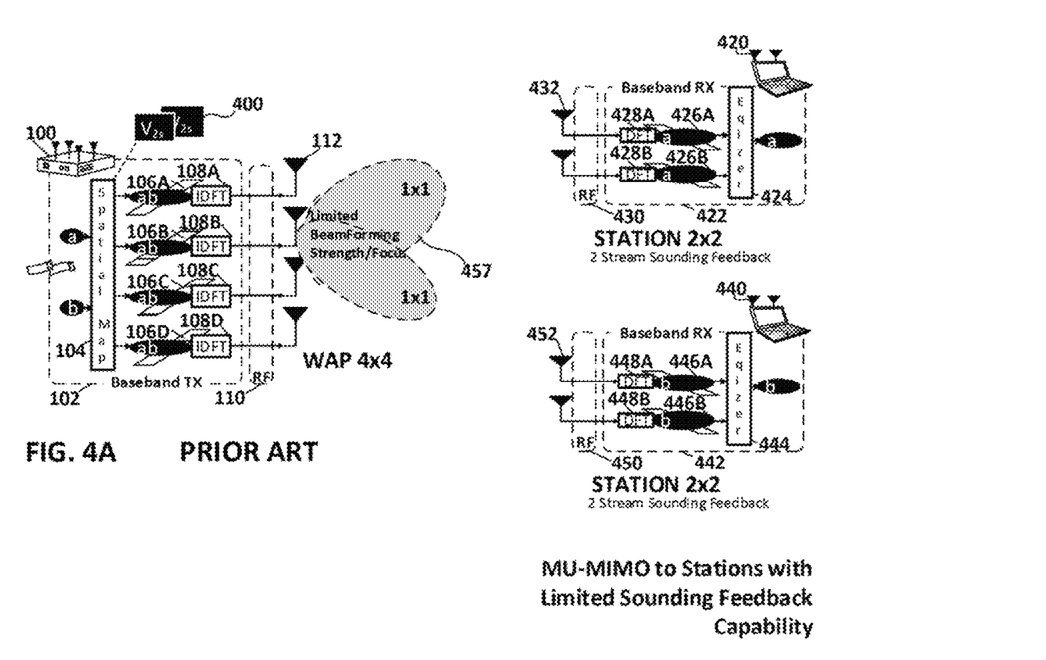
FIGS. 4A-B are system views of a multi-user (MU) multiple-input multiple-output (MIMO) downlink to stations with constrained sounding capabilities using a prior art sounding (FIG. 4A) and a composite set of soundings in accordance with an embodiment of the invention (FIG. 4B) respectively.
Figure 4B:
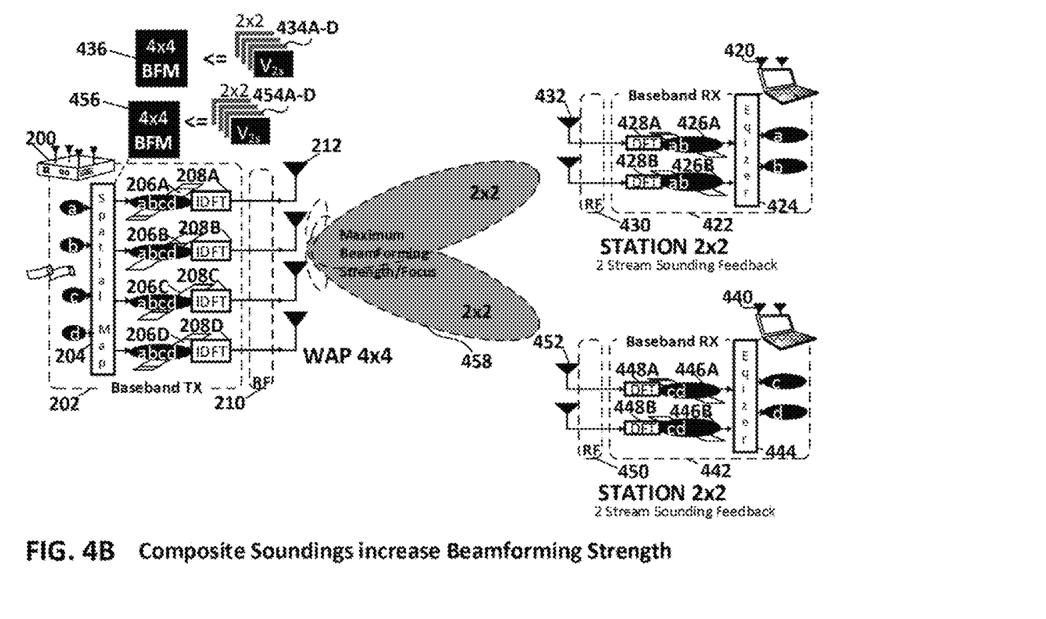

FIGS. 4A-B are system views of a multi-user (MU) multiple-input multiple-output (MIMO) downlink to stations with constrained sounding capabilities using a prior art sounding (FIG. 4A) and a composite set of soundings in accordance with an embodiment of the invention (FIG. 4B) respectively.

FIG. 4A shows the Prior Art WAP 100 discussed above in connection with FIGS. 1A-B effecting an MU-MIMO downlink to both stations 420 and 440. Station 420 is identified as a 2×2 device having two antenna and supporting up to 2 streams of downlink and uplink communications. The station has a baseband section 422 and a radio frequency (RF) section 430 coupled to 2 multiple-input multiple-output (MIMO) antennas 432. The baseband receive portion is shown and the corresponding transmit portion is not. The discrete Fourier Transform (DFT) modules 428A-B are coupled to a corresponding one of the two antenna 432, to transform received communications from the time to the frequency domain. The output bins 426A-B of the DFT modules are coupled to the input of the equalizer 424. The sounding feedback capabilities of the station 420 do not match the WAPs capabilities in terms of number of streams and antennas. The WAP could handle up to 4 streams on a downlink sounding, but can not do so because the station is only capable of providing sounding feedback for up to two streams. Station 440 is also a 2×2 device. The station has a baseband section 442 and a radio frequency (RF) section 445 coupled to 2 multiple-input multiple-output (MIMO) antennas 452. The DFT modules 448A-B are coupled to a corresponding one of the two antenna 452, to transform received communications from the time to the frequency domain. The output bins 446A-B of the DFT modules are coupled to the input of the equalizer 444. The sounding feedback capabilities of the station 440 do not match the WAPs capabilities in terms of number of streams and antennas. The WAP could handle up to 4 streams on a downlink sounding, but can not do so because the station is only capable of providing sounding feedback for up to two streams. After the single sounding of each station by the WAP a 1×1 link from the WAP to each station is established using the underdimensioned sounding responses 400 from each station. The beamforming strength 457 of the MU-MIMO downlink is limited by the underdimensioned sounding available from both stations.

FIG. 4B shows the WAP 200 shown in FIG. 2A-2B establishing a MU-MIMO downlink to the above discussed stations 420 and 440. A composite sounding is used to obtain the linearly independent set of four partial beamforming matrices 434A-D and 454A-D from stations 420 and 440 respectively. These in turn are expanded into corresponding full beamforming matrices 4326 and 456 for station 420 and 440 respectively. These are then used to spatially map orthogonal communications of streams "ab" to station 420 and "cd" to station 440. The channels on each link between the WAP and a corresponding one of the stations are fully characterized and thus each link is able to support 2×2 communications. The beamforming strength and focus 458 of the MU-MIMO downlink is enhanced by virtue of the fully dimensioned beamforming matrices 436, 456 determined by the WAP. The WAP 200 expands the composite set of four partial beamforming matrices 434A-D from station 420 to obtain full beamforming matrix 436. The WAP 200 expands the composite set of four partial beamforming matrices 454A-D from station 440 to obtain full beamforming matrix 456.

In an embodiment of the invention where one of the MU-MIMO downlink target stations has sounding feedback capability in terms of the number of characterizable streams, which matches that of the WAP only a single sounding may be required, with the composite sounding devoted to fully characterizing the downlink channel to the remaining station with limited sounding feedback capability.

Figure 5A:
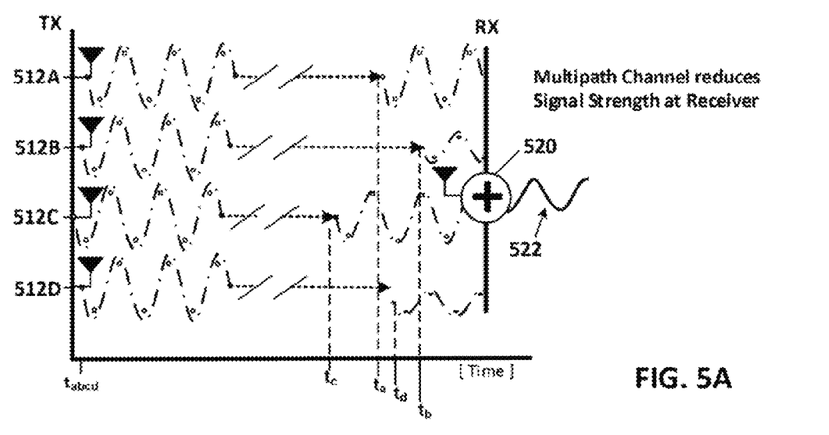
FIGS. 5A-C are signal diagrams of a MIMO downlink to a station with constrained sounding capabilities: without beamforming (FIG. 5A), with beamforming resulting from a prior art sounding (FIG. 5B) and with beamforming resulting from a composite sounding in accordance with an embodiment of the invention (FIG. 5C)
Figure 5B:
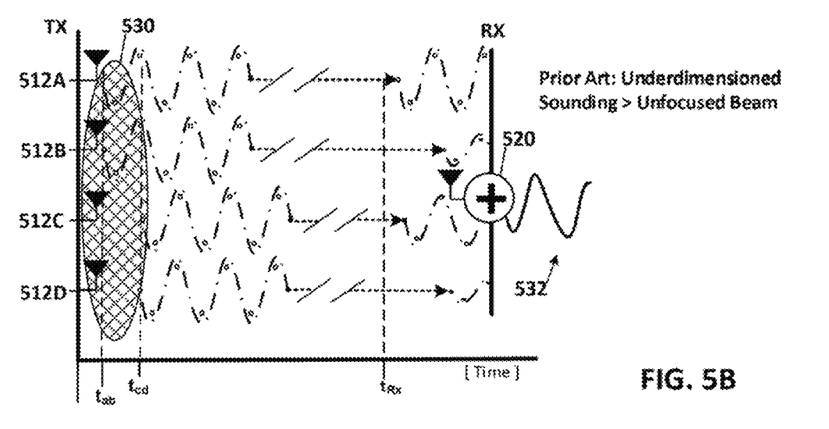
Figure 5C:
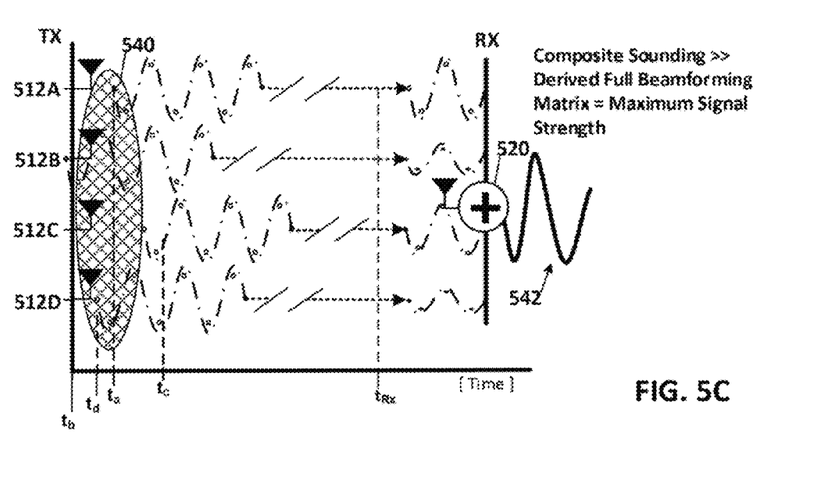

FIGS. 5A-C are signal diagrams of a MIMO downlink to a station with constrained sounding capabilities: without beamforming (FIG. 5A), with beamforming resulting from a single prior art sounding (FIG. 5B) and with beamforming resulting from a composite sounding in accordance with an embodiment of the invention (FIG. 5C).

FIG. 5A is a signal diagram of a MIMO downlink without beamforming to a station with constrained sounding capabilities. Four WAP antennas 512A-D are shown initiating transmission (TX) of a common sinusoidal waveform of equal amplitude and frequency over each of the antennas starting at the same time, $t_{abcd}$. Each signal exhibits a different delay and attenuation upon arrival at the RX antenna and summer. This is due to the differences in the individual paths or channel between each of the four TX antenna and the single receive (RX) antenna and adder 520. The result is that there is considerable destructive interference between each upon arrival at the RX antenna and adder. The aggregate signal 522 at the output of the adder is severely attenuated in amplitude as shown, and may also exhibit overtones or higher frequency harmonics than the original signal due to different transit times and associated phase shifts relative to the other signals.

FIG. 5B is a signal diagram of a MIMO downlink with beamforming to a station with constrained sounding capabilities. The beamforming 530 is partial since the channel sounding is underdimensioned due to the inability of the receiver to fully characterize all four streams transmitted by the WAP. In the example shown, the associated sounding feedback is assumed to be two streams. Four WAP antennas 512A-D are shown initiating transmission (TX) of the common sinusoidal waveform of equal amplitude and frequency at two discrete times, $t_{ab}$ and $t_{cd}$ as determined from the partial sounding. The staggered transmission times are designed to align the received signals with one another so that they constructively interfere with one another. However, as shown in the resultant sum signal 532 at the output of adder 520 the underdimensioned sounding limits the effectiveness of the beamforming.

FIG. 5C is a signal diagram of a MIMO downlink without beamforming to a station with constrained sounding capabilities. Four WAP antennas 512A-D are shown initiating transmission (TX) of a common sinusoidal waveform of equal amplitude and frequency over each of the antennas starting at individually staggered or offset times $t_b$, $t_d$, $t_a$, $t_c$ designed based on a prior composite sounding to synchronize the time of arrival and the resultant phase of all signals at the RX antenna and adder 520. The composite sounding performed by the WAP and further the aggregation of the set of Linearly Independent partial sounding responses allows the WAP to fully characterize the entire channel including all paths between the four TX and the single RX antenna with a full beamforming matrix. The result is that there is considerable constructive interference between all four signal when they arrive at the receiving stations antenna and summer 520. The aggregate signal 542 at the output of the adder has increased in amplitude due to the constructive interference with the other signals which collectively have an additive effect on received signal strength. This maximizes received signal strength with the same transmit power, and is one of the attributes of effective beamforming.

Figure 6:
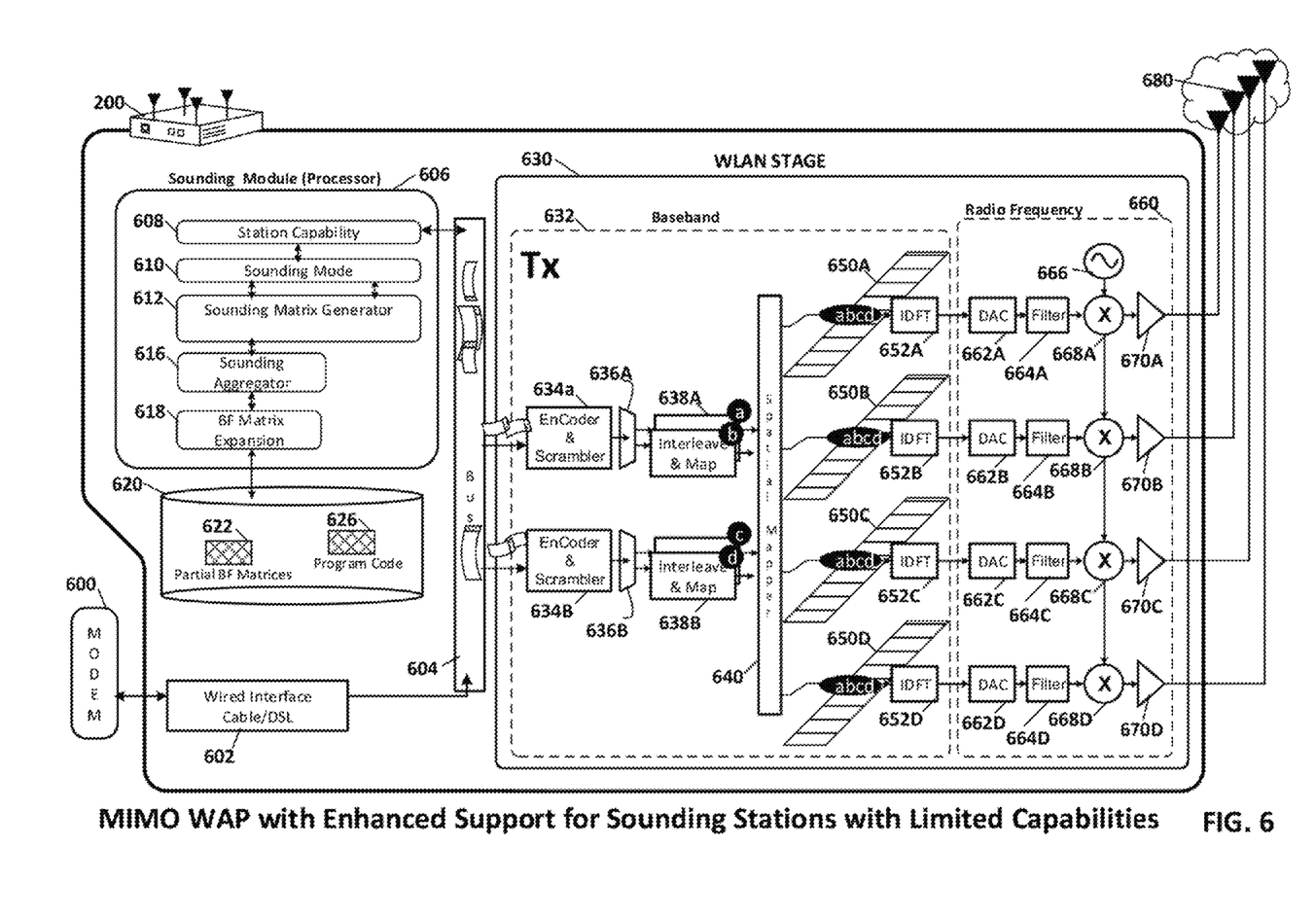
FIG. 6 is a hardware block diagram of a MU-MIMO WAP with support for either single sounding or composite soundings depending on the relative capabilities of the WAP and the target station(s)

FIG. 6 is a hardware block diagram of a MU-MIMO WAP 200 shown in FIGS. 2A-B and FIG. 4B. The WAP supports either single sounding or composite soundings depending on the relative capabilities of the WAP and the target station(s). The WAP in this embodiment of the invention is identified as a 4×4 WAP supporting as many as 4 discrete communication streams over four antennas 680. The WAP couples to the Internet via an integral wired interface 602 to a cable or digital subscriber line (DSL) modem 600. A packet bus 604 couples the modem to the MU-MIMO wireless local area network (WLAN) stage 630. The WLAN stage includes a baseband module 632 and a radio frequency (RF) module 660 coupled to antennas 680. In FIG. 6 only the transmit components of the baseband and RF portions of the WAP are shown. The WAP however has a full and complementary set of receive path components and operates for transmitting and receiving communications from all associated wireless stations on its network.

In the baseband portion 632 communications for each user/station are processed. In the embodiment shown two pairs of streams are being processed for discrete MU delivery to two discrete stations/users. The baseband portion is dynamically configurable to support MU groups from 2-4 users/stations. The communications "a,b" to the $1^{st}$ of the two users are encoded and scrambled in encoder scrambler module 634A and de-multiplexed into two streams in demultiplexer 636A. Each stream "a, b" is subject to interleaving and constellation mapping in an associated interleaver mapper 638A and passed to the spatial mapper 640. Communications for the $2^{nd}$ user/station are encoded and scrambled in encoder scrambler module 634B and de-multiplexed into two streams in demultiplexer 636B. Each stream "c, d" is subject to interleaving and constellation mapping in an associated interleaver mapper 638B and passed to the spatial mapper 640. The spatial mapper maps the streams onto each of the transmit chains using a full beamforming matrix provided by sounding module 606 from a single or a composite sounding. The spatially multiplexed streams are injected into all OFDM tones 650A-D of the four inverse discrete Fourier Transform (IDFT) modules 652A-D respectively for Radio Frequency (RF) upconversion in RF stage 660 and for transmission by each of the WAP's four antenna 680.

The RF stage includes 4 transmit chains each with its own digital-to-analog converter (DAC) 662A-D, filter 664-D, upconverter 668A-D and power amplifier 670A-D. Each of the four transmit chains couples to a corresponding one of the WAP's four antenna 680. A common oscillator 666 drives the upconverters 668A-D.

The WAP 601 also includes a sounding module 606 coupled to storage 620. The sounding module includes a station capability module 608, a sounding mode module 610, a sounding matrix generator 612, a sounding aggregator 616, and a beamforming matrix expansion module 618. The station capability module 608 is configured to determine a sounding feedback capability of the at least one targeted station node, in terms of a maximum number of streams. The sounding mode module 610 is configured to determine whether a number of communication streams supported by the WAP matches the number of communication streams contained in a sounding response from a targeted station node. The sounding mode module then initiates either a single sounding or a composite set of an integer "N" soundings of the communication channel between the WAP and the target station node based on an affirmative and a negative match determination respectively. The sounding matrix generator 612 is configured to generate "N" linearly independent (LI) spatial mapping matrices (SMM) each associated with a corresponding one of the soundings in the composite set of soundings from the WAP, responsive to a negative match determination by the sounding mode module. In an embodiment of the invention the sounding matrix generator generates the "N" LI SMM using a lookup table. In an other embodiment of the invention the sounding matrix generator generates the "N" LI SMM using a trial and error method or via direct calculation. The sounding aggregator 616 is configured to aggregate a plurality of partial beamforming matrices received from the at least one targeted station node in response to the composite soundings generated by the sounding matrix generator. These are stored 622 in storage 620. The beamforming expansion module 618 is configured to expand the composite set of partial beamforming matrices aggregated by the sounding aggregator into a full beamforming matrix for spatially mapping downlink communications between the WAP and the at least one targeted station node; thereby enhancing the communication capabilities of the WAP.

In an embodiment of the invention the sounding module and associated modules thereof may be implemented by a processor executing program code 626 stored in memory element 620.

Figure 7:
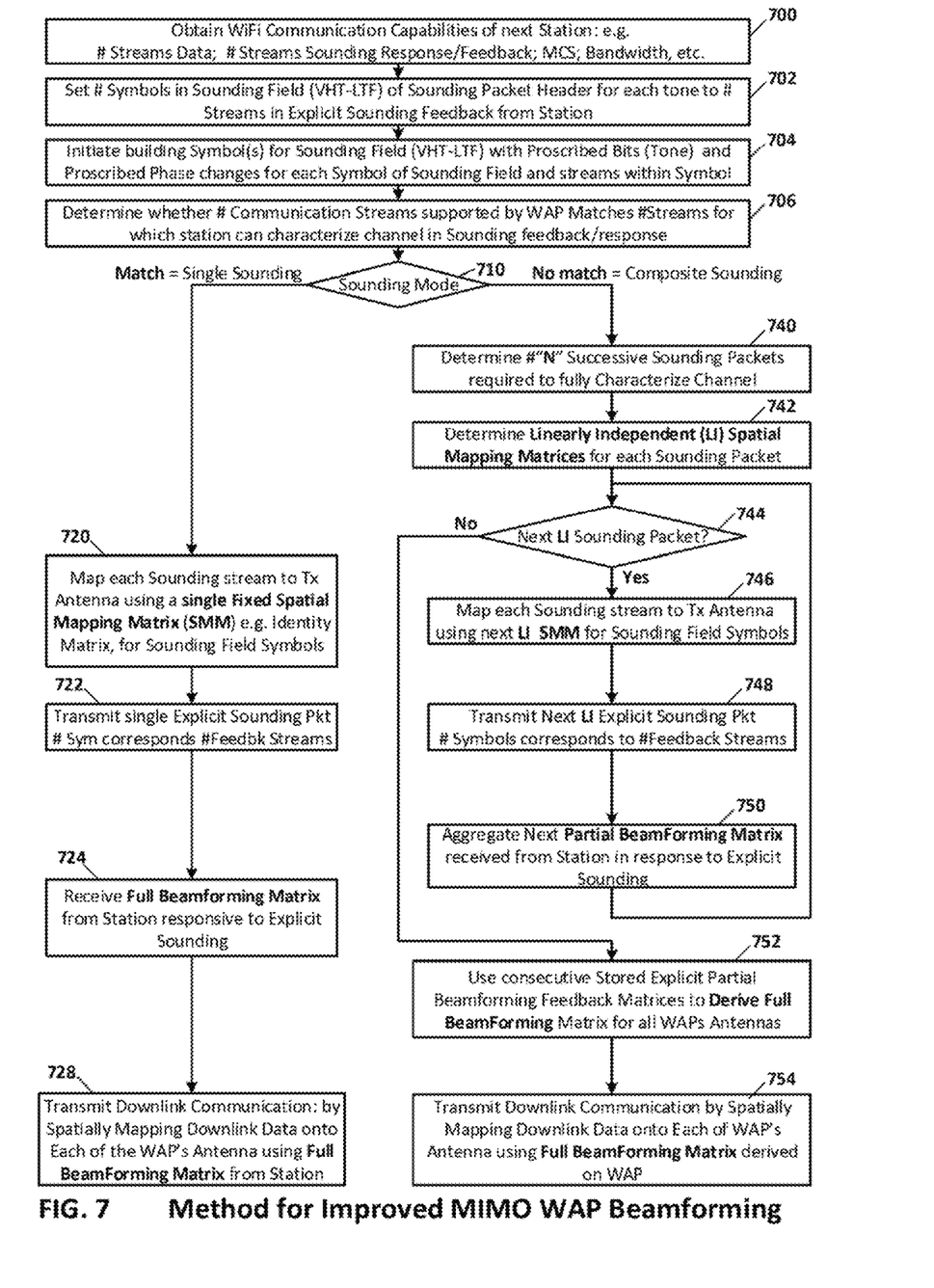
FIG. 7 is a process flow diagram of processes associated with enhanced sounding capabilities of a MU MIMO WAP in accordance with an embodiment of the current invention.

FIG. 7 is a process flow diagram of processes associated with enhanced sounding capabilities of a MU MIMO WAP in accordance with an embodiment of the current invention. Processing begins at process block 700 in which a capabilities exchange between the WAP and at least one targeted station is initiated. In this capabilities exchange the communication capabilities of the station are determined such as: number of data streams supported, number of antenna; number of streams in sounding response or feedback; the modulation and coding schema (MCS) and supported bandwidth. Next in process 702 the number of symbols in the sounding field, e.g. the VHT-LTF field, are determined for each tone based on the number of streams supported in the explicit sounding feedback from the station. Next in process 704 the building of the symbol(s) for the sounding field is initiated, including the proscribed bits for each tone, the proscribed phase and phase change for each symbol of the sounding field and streams within each sounding symbol, as per the IEEE 802.11ac or other relevant standard. Then in process 706 a determination is initiated as to whether the number of communication streams supported by the WAP matches the number of streams for which the station can characterize the channel in the sounding feedback or response from the station. In decision process 710 an affirmative match determination that the supported streams in the station's sounding feedback matches the # of streams supported by the WAP results in the passing of control to the single sounding branch of processes commencing with process 720. Alternately if a negative match determination is made, that the number of supported streams in the station's sounding feedback is less than the number of streams supported by the WAP then control is passed to the composite sounding branch of processes commencing with process 740.

The single sounding branch or processes 720-728 utilize the matched sounding capabilities of the WAP and station to obtain from the station a full beamforming matrix for spatially mapping subsequent communications. In the initial single sounding process 720 each sounding stream on the WAP is spatially mapped using a fixed spatial mapping matrix (SMM) e.g. an identity matrix identity matrix, to the transmit antennas of the WAP. Then in process 722 a single Explicit sounding packet is transmitted to the target station. The sounding packet includes a number of symbols corresponding to the number of feedback streams supported by the station in the sounding response. Only a single sounding is required because of the match between the WAP and stations stream sounding capabilities. Next control is passed to process 724 in which the response to the sounding is received by the WAP. That response includes the "V" and Σ matrices in accordance with the IEEE 802.11ac standard, for example. The full Beamforming matrix "V" obtained in the single sounding feedback from the station is used in process 728 to control the spatial mapping of subsequent downlink communications onto each of the WAP's antenna. Control then returns to process 700.

The composite sounding branch or processes 740-754 utilize composite soundings to overcome the lack of support in the station for soundings which exploit the full capability of the WAP. The station is induced to send partial soundings responses to the WAP which collectively allow the WAP, by virtue of their linear independence from one another, to expand the partial matrices to a full beamforming matrix thereby allowing the WAP to exploit its full communication capabilities for subsequent downlink communications with the station(s). In the initial composite sounding process 740 a determination is made as to the number "N" of successive sounding packets required to fully characterize the communication channel between the WAP and the station(s). Next in process 742 a determination is made as to a set of linearly independent (LI) spatial mapping matrices with one member of each set spatially mapping the sounded streams onto each of the WAP's MIMO antenna. In decision process 744 a determination is made as to whether there is a remaining one of the successive sounding packets to be sent. If there are not, then control passed to process 752. Alternately, if there is a remaining composite sounding to be made then control passes to process 746. In process 746 the next linearly independent spatial mapping matrix is used to map the current sounding, specifically the mapping of each sounding symbol and associated streams to one or more of the WAPs transmit antenna. Then in process 748 the next linearly independent explicit sounding packet is transmitted from the WAP to the station(s). The sounding packet includes a number of symbols corresponding to the number of feedback streams supported by the station in the sounding response. Next in process 750 the next partial beamforming matrix received from the station in response to the explicit sounding is aggregated with the sounding responses from the station to the other soundings in the composite set. Control then returns to decision process 744. When all composite soundings have been sent, and all sounding responses responsive thereto have been aggregated control passes to process 752.

In process 752 the aggregated stored sounding responses from the station are used by the WAP to derive a full beamforming matrix. This matrix expansion allows the WAP to derive a full beamforming matrix completely characterizing the communication channel between each of the WAP's antennas and the target stations receive antennas. Then in process 754 the full beamforming matrix derived on the WAP from the partial soundings of the station are used to spatially map downlink data onto each of the WAP's antenna for transmission of subsequent downlink communications therewith. Control then returns to process 700.

The components and processes disclosed herein may be implemented in software, hardware, firmware, or a combination thereof including program code software, a memory element for storing the program code software and a processor for executing the program code software, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A wireless access point (WAP) apparatus having a plurality of antennas and supporting multiple-input multiple-output (MIMO) wireless communications with associated station nodes on a selected one of a plurality of orthogonal frequency division multiplexed (OFDM) communication channels; and the wireless access point apparatus comprising:

a sounding mode module configured to determine whether a number of communication streams supported by the WAP matches the number of communication streams contained in a sounding response from at least one targeted station node among the associated station nodes, and initiating either a single sounding or a composite set of an integer "N" soundings of the communication channel between the WAP and the at least one targeted station node based on an affirmative and a negative match determination respectively;

a sounding matrix generator configured to generate "N" linearly independent (LI) spatial mapping matrices (SMM) each associated with a corresponding one of the soundings in the composite set of soundings from the WAP, responsive to a negative match determination by the sounding mode module;

a sounding aggregator configured to aggregate a plurality of partial beamforming matrices received from the at least one targeted station node in response to the composite soundings generated by the sounding matrix generator; and a beamforming expansion module configured to expand the plurality of partial beamforming matrices aggregated by the sounding aggregator into a full beamforming matrix for spatially mapping downlink communications between the WAP and the at least one targeted station node; thereby enhancing the communication capabilities of the WAP.

2. The wireless access point (WAP) apparatus of claim 1, further comprising:

the sounding matrix generator further configured to generate the composite set of soundings sequentially in discrete sounding packets, and the sounding in each packet spatially mapped to associated ones of the WAP's antennas with a corresponding one of the "N" linearly independent SMM.

3. The wireless access point (WAP) apparatus of claim 1, further comprising:

the sounding matrix generator further configured to generate the composite set of soundings sequentially in discrete symbols within a single sounding packet, and the sounding in each symbol spatially mapped to associated ones of the WAP's antennas with a corresponding one of the "N" linearly independent SMM.

4. The wireless access point (WAP) apparatus of claim 1, further comprising:

a station capability module to configured to determine a sounding feedback capability of the at least one targeted station node, in terms of a maximum number of streams.

5. The wireless access point (WAP) apparatus of claim 1, further comprising:

a station capability module configured to determine a communication capability of the at least one targeted station node, in terms of a number of supported communication streams; and the beamforming expansion module further configured to determine a mix of downlink communication diversity and spatial multiplexing mapping which correlates with both a channel rank exhibited in the full beamforming matrix together with the number of supported communication streams as determined by the station capability module.

6. The wireless access point (WAP) apparatus of claim 1, further comprising:

the sounding mode module further configured to initiate the composite set of soundings of the communication channels between the WAP and at least two multi-user (MU) MIMO targeted station nodes.

7. The wireless access point (WAP) apparatus of claim 1, further comprising:

a station capability module configured to determine a communication capability of the at least one targeted one of the station nodes, in terms of a number of antenna; and the sounding mode module further configured to determine the integer "N" composite soundings which correspond with both: a number of communication streams supported by the WAP, together with the number of communication streams contained in a sounding response therefrom.

8. The wireless access point (WAP) apparatus of claim 1, further comprising:

the sounding mode module further configured to increase in magnitude the integer "N" composite soundings in order to resolve phase shifts introduced between successive ones of the composite soundings relative to one another.

9. The wireless access point (WAP) apparatus of claim 1, configured to support the IEEE 802.11ac communication standard.

10. A method for operating a wireless access point (WAP) having a plurality of antennas and supporting multiple-input multiple-output (MIMO) wireless communications with associated station nodes on a selected one of a plurality of orthogonal frequency division multiplexed (OFDM) communication channels; and the method comprising:

determining whether a number of communication streams supported by the WAP matches the number of communication streams characterized in a sounding response from at least one targeted station node among the associated station nodes;

initiating either a single sounding or a composite set of an integer "N" soundings of the communication channel between the WAP and the at least one targeted station node based on an affirmative and a negative match determination respectively, in the determining act;

generating "N" linearly independent (LI) spatial mapping matrices (SMM) each associated with a corresponding one of the soundings in the composite set of soundings from the WAP, responsive to a negative match determination in the determining act;

aggregating a plurality of partial beamforming matrices received from the targeted one of the associated station nodes in response to the composite soundings generated in the generating act; and expanding the plurality of partial beamforming matrices aggregated in the aggregating act into a full beamforming matrix for spatially mapping downlink communications between the WAP and the targeted one of the associated station nodes; thereby enhancing the communication capabilities of the WAP.

11. The method for operating a WAP of claim 10, wherein the generating act further comprises:

generating the composite set of soundings sequentially in discrete sounding packets;

spatially mapping the sounding in each packet to associated ones of the WAP's antennas with a corresponding one of the "N" linearly independent SMM.

12. The method for operating a WAP of claim 10, wherein the generating act further comprises:

generating the composite set of soundings sequentially in discrete symbols within a single sounding packet; and spatially mapping the sounding in each symbol to associated ones of the WAP's antennas with a corresponding one of the "N" linearly independent SMM.

13. The method for operating a WAP of claim 10, further comprising:

determining a sounding feedback capability of the at least one targeted station node, in terms of a maximum number of streams.

14. The method for operating a WAP of claim 10, further comprising:

determining a communication capability of the at least one targeted station node, in terms of a number of supported communication streams; and determining a mix of downlink communication diversity and spatial multiplexing mapping which correlates with both a channel rank exhibited in the full beamforming matrix together with the number of supported communication streams.

15. The method for operating a WAP of claim 10, further comprising:

initiating the composite set of soundings of the communication channels between the WAP and at least two multi-user (MU) MIMO targeted station nodes.

16. The method for operating a WAP of claim 10, further comprising:

determining a communication capability of the at least one targeted one of the station nodes, in terms of a number of antenna; and determining the integer "N" composite soundings which correspond with both: a number of communication streams supported by the WAP, together with the number of communication streams contained in a sounding response therefrom.

17. The method for operating a WAP of claim 10, further comprising:

increasing in magnitude the integer "N" composite soundings in order to resolve phase shifts introduced between successive ones of the composite soundings relative to one another.

18. A non-transient computer readable medium containing program instructions for causing a computer to perform the method of:

determining whether a number of communication streams supported by a wireless access point (WAP) matches the number of communication streams characterized in a sounding response from at least one targeted station node among the associated station nodes;

initiating either a single sounding or a composite set of an integer "N" soundings of a communication channel between the WAP and the at least one targeted station node based on an affirmative and a negative match determination respectively, in the determining act;

generating "N" linearly independent (LI) spatial mapping matrices (SMM) each associated with a corresponding one of the soundings in the composite set of soundings from the WAP, responsive to a negative match determination in the determining act;

aggregating a plurality of partial beamforming matrices received from the targeted one of the associated station nodes in response to the composite soundings generated in the generating act; and expanding the plurality of partial beamforming matrices aggregated in the aggregating act into a full beamforming matrix for spatially mapping downlink communications between the WAP and the targeted one of the associated station nodes; thereby enhancing the communication capabilities of the WAP.

19. The non-transient computer readable medium of claim 18, further containing program instructions for causing a computer to perform the method of:

generating the composite set of soundings sequentially in discrete sounding packets;

spatially mapping the sounding in each packet to associated ones of the WAP's antennas with a corresponding one of the "N" linearly independent SMM.

20. The non-transient computer readable medium of claim 18, further containing program instructions for causing a computer to perform the method of:

generating the composite set of soundings sequentially in discrete symbols within a single sounding packet; and spatially mapping the sounding in each symbol to associated ones of the WAP's antennas with a corresponding one of the "N" linearly independent SMM.

* * * * *